(12) United States Patent
Pasalapudi et al.

(10) Patent No.: US 12,308,999 B2
(45) Date of Patent: May 20, 2025

(54) X-OVER-Y TUNNEL SIGNALING AND CONFIGURATION, AND USE OF CONFIGURED X-OVER-Y TUNNEL(s)

(71) Applicant: Juniper Networks, Inc., Sunnyvale, CA (US)

(72) Inventors: Satya Praveen Kumar Pasalapudi, Tracy, CA (US); Kaliraj Vairavakkalai, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/209,464

(22) Filed: Jun. 13, 2023

(65) Prior Publication Data

US 2024/0323048 A1    Sep. 26, 2024

Related U.S. Application Data

(60) Provisional application No. 63/454,606, filed on Mar. 24, 2023.

(51) Int. Cl.
*H04L 12/46* (2006.01)
(52) U.S. Cl.
CPC ................ *H04L 12/4633* (2013.01)
(58) Field of Classification Search
CPC .................................. H04L 12/4633
USPC ....................................... 709/238
See application file for complete search history.

(56) References Cited

U.S. PATENT DOCUMENTS

| 2017/0063783 | A1* | 3/2017 | Yong | H04L 69/22 |
| 2019/0386915 | A1* | 12/2019 | Paul | H04L 45/64 |
| 2021/0258249 | A1* | 8/2021 | Torvi | H04L 45/566 |
| 2021/0385150 | A1* | 12/2021 | Shrivastava | H04L 45/02 |
| 2022/0239588 | A1* | 7/2022 | Malhotra | H04L 45/24 |
| 2023/0049690 | A1* | 2/2023 | Ponaka | H04L 12/4641 |

OTHER PUBLICATIONS

T. Herbert, et al, "Generic UDP Encapsulation," draft-ieft-intarea-gue-09 (Internet Engineering Task Force, Oct. 26, 2019).
Extended European Search Report (EESR) from counterpart European application No. 23195468.6-1216, mailed on Feb. 16, 2024.

* cited by examiner

*Primary Examiner* — Karen C Tang
(74) *Attorney, Agent, or Firm* — John C. Pokotylo; Pokotylo Patent Services

(57) ABSTRACT

Network operators can define port mappings for UDP destination ports and the encapsulated protocol/traffic type (X) in UDP. BGP may be used to notify the UDP destination port-to-traffic type mapping to an encapsulator. A generic UDP encapsulation mechanism (X-in-UDP), where UDP can be used to encapsulate packets of any user configured protocol/traffic type X (e.g., IPv4, IPv6, MPLS, etc.), is described. Primary benefits of using UDP for encapsulation are to leverage UDP port numbers for load-balancing. Generic UDP encapsulation of any protocol/traffic type using user defined port-maps provides flexibility to network operators in constructing different overlay networks. UDP encapsulation helps leverage fine-grade load balancing over Equal-Cost Multipath (ECMP).

13 Claims, 10 Drawing Sheets

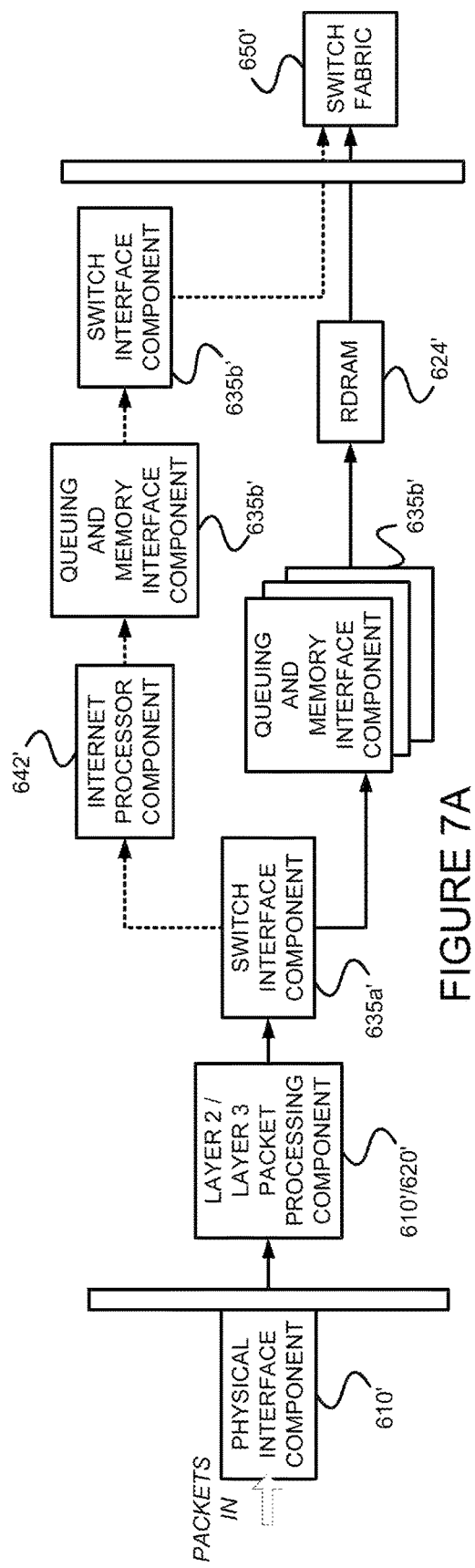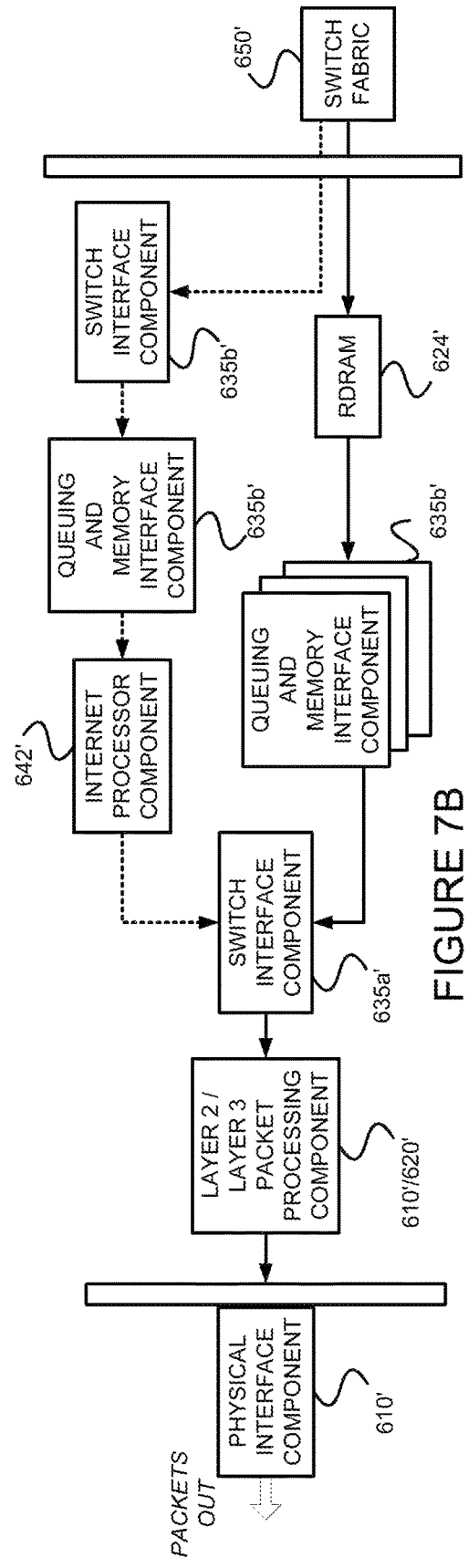

X-OVER-Y TUNNEL SIGNALING AND CONFIGURATION, AND USE OF CONFIGURED X-OVER-Y TUNNEL(s)

§ 1. RELATED APPLICATION(S)

This application claims the benefit of U.S. Provisional Application No. 63/454,606 (referred to as "the '606 provisional" and incorporated herein by reference), titled "X-Over UDP Tunnel Signaling using BGP," filed on Mar. 24, 2023, and listing Satya Praveen Kumar Pasalapudi and Kaliraj Vairavakkalai as the inventors. The scope of the invention is not limited to any requirements of the specific embodiments in the '606 provisional.

§ 2. BACKGROUND OF THE INVENTION

§ 2.1 Field of the Invention

The present description concerns communications networks. In particular, the present description concerns establishing and using tunnels within a communications network.

§ 2.2 Background Information

Tunneling provides a private, secure path through an otherwise public network by encapsulating arbitrary packets inside a transport protocol. Tunnels may be used to connect discontinuous subnetworks and enable encryption interfaces, virtual private networks (VPNs), and multi-protocol label switching (MPLS).

As one example, the document Xu, X., Sheth, N., Yong, L., Callon, R., and D. Black, "Encapsulating MPLS in UDP", *Request for Comments (RFC)* 7510 (Internet Engineering Task Force (IETF), April 2015)(referred to as "RFC 7510" and incorporated herein by reference) specifies an IP-based encapsulation for MPLS, called MPLS-in-UDP, for situations where UDP (User Datagram Protocol) encapsulation is preferred to the direct use of MPLS, e.g., to enable UDP-based ECMP (Equal-Cost Multipath) or link aggregation. Unfortunately, however, RFC 7510 is restricted to a specific, pre-defined, UDP destination port (i.e., 6635) allocated by the Internet Assigned Numbers Authority (IANA) to indicate that the UDP tunnel payload is an MPLS packet.

It would be useful to allow network operators and administrators the flexibility to encapsulate any protocol or traffic type (X) in a tunnel, such as a UDP tunnel for example. It would be especially useful to allow network operators and administrators to easily configure routers at the ingress and/or egress of such a tunnel to encapsulate and/or decapsulate different types of traffic, especially on an ad-hoc basis (e.g., without needing a fixed value allocated by AINA) within a network under their control.

§ 3. SUMMARY OF THE INVENTION

Example methods for use on a network device may be used to allow network operators and administrators the flexibility to encapsulate any protocol or traffic type (X) in a tunnel, such as a UDP tunnel for example, by: (a) receiving, by the network device, information including (1) a type of a tunnel to be established, (2) a property of the tunnel to be established, and (3) an association of the property of the tunnel to be established with one of a plurality of different traffic types; (b) determining whether or not the network device is the egress of the tunnel to be established; and (c) responsive to a determination that the network device is at the egress of the tunnel to be established, programming, automatically, a decapsulator on the network device and associating the decapsulator with the property (e.g., the destination port) of the tunnel to be established, to process, in accordance with the traffic type, packets received on the destination port of the (e.g., UDP) tunnel to be established, and otherwise, responsive to a determination that the network device is not the egress of the tunnel to be established, setting up forwarding state to send the traffic type.

In some example implementations of an example method consistent with the present description, the information received is sourced from a central controller.

In some example implementations of an example method consistent with the present description, the network device is an ingress of the tunnel to be established, and the information received is sourced from the egress of the tunnel to be established.

In some example implementations of an example method consistent with the present description, the property of the tunnel to be established is a destination port of the tunnel to be established.

In some example implementations of an example method consistent with the present description, the tunnel to be established is a UDP tunnel and the property of the tunnel to be established is a UPD destination port.

In some example implementations of an example method consistent with the present description, the information received by the network device is carried as a path attribute in a BGP update message. For example, the information received by the network device may be carried in a tunnel encapsulation attribute TLV. In such example implementations, the tunnel encapsulation attribute TLV may include a tunnel destination port sub TLV having a value specifying, via the received association, the one of the plurality of different traffic types. The tunnel encapsulation attribute TLV may include a tunnel encapsulation protocol sub TL V having a value uniquely corresponding to, and associated with, the one of the plurality of different traffic types.

In some example implementations of an example method consistent with the present description, more than one tunnel may be established, and/or a given tunnel may carry more than one traffic type (e.g., corresponding to different UDP destination port values). Such example implementations may further include: (d) receiving, by the network device, further information including (1) the type of a second (e.g., UDP) tunnel to be established, (2) the property of the second (e.g., UDP) tunnel to be established, and (3) an association of the property of the second tunnel to be established with a different one of a plurality of different traffic types to be carried by the second tunnel to be established; (e) determining whether or not the network device is the egress of the second tunnel to be established; and (f) responsive to a determination that the network device is the egress of the second tunnel to be established, programming, automatically, a second decapsulator on the network device and associated with a (e.g., UDP) destination port, to process, in accordance with the different traffic type, packets received on the destination port of the second (e.g., UDP) tunnel to be established, and otherwise, responsive to a determination that the network device is not the egress of the second tunnel to be established, setting up forwarding state to send the different traffic type.

Once the tunnel is established, some example implementations of an example method consistent with the present description may further include: (d) receiving, on a device at the destination of the (e.g., UDP) tunnel, a packet; (e) decapsulating, using the decapsulator, the packet received to generate a decapsulated packet; (f) determining whether or not the decapsulated packet complies with the one of the plurality of traffic types selected; and (g) responsive to determining that the decapsulated packet does not comply with the one of the plurality of different traffic types selected, discarding the decapsulated packet, and otherwise, responsive to determining that the decapsulated packet complies with the one of the plurality of different traffic types selected, processing the decapsulated packet in accordance with the one of the plurality of different traffic types selected.

In some example implementations of an example method consistent with the present description, a central controller or the egress device of the tunnel may advertise information for establishing X-in-Y tunnels, where X is a traffic type and Y is the type of tunnel. Such example methods may include: (a) receiving an identifier of one of a plurality of traffic types, the one of the plurality of traffic types to be carried over a tunnel to be established; (b) determining a tunnel destination port value using (1) the identifier of traffic type received and (2) a stored association of traffic type to tunnel destination port value; (c) generating a message including (1) information about the tunnel to be established, and (2) the tunnel destination port value determined; and (d) transmitting the message generated for receipt by at least one of (A) a first device at an ingress of the tunnel to be established, and/or (B) by a second device at the egress of the tunnel to be established, wherein both the first device and the second device are in the communications network.

The example method(s) may be implemented on a network device(s), such as on one or more routers for example. The network device might be a device at the ingress of the tunnel(s). Otherwise, the network device might be a device at the egress of the tunnel(s). A non-transitory computer-readable medium may be used to store processor-executable instructions for performing any of the example methods consistent with the present description.

§ 4. BRIEF DESCRIPTION OF THE DRAWINGS

FIGS. 7A and 7B is an example of operations of the example architecture of FIG. 6.

§ 5. DETAILED DESCRIPTION

The present disclosure may involve novel methods, apparatus, message formats, and/or data structures to allow network operators and administrators the flexibility to encapsulate any protocol or traffic type (X) in a tunnel, such as a UDP tunnel for example. The present disclosure may involve novel methods, apparatus, message formats, and/or data structures to allow network operators and administrators to easily configure routers at the ingress and/or egress of such a tunnel to encapsulate and/or decapsulate different types of traffic, especially on an ad-hoc basis (e.g., without needing a fixed value allocated by AINA) within a network under their control. The following description is presented to enable one skilled in the art to make and use the described embodiments, and is provided in the context of particular applications and their requirements. Thus, the following description of example embodiments provides illustration and description, but is not intended to be exhaustive or to limit the present disclosure to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present description unless explicitly described as such. Also, as used herein, the article "a" is intended to include one or more items. Where only one item is intended, the term "one" or similar language is used. Thus, the present disclosure is not intended to be limited to the embodiments shown and the inventors regard their invention as any patentable subject matter described.

§ 5.1 Example Method(s)

Figure 1:
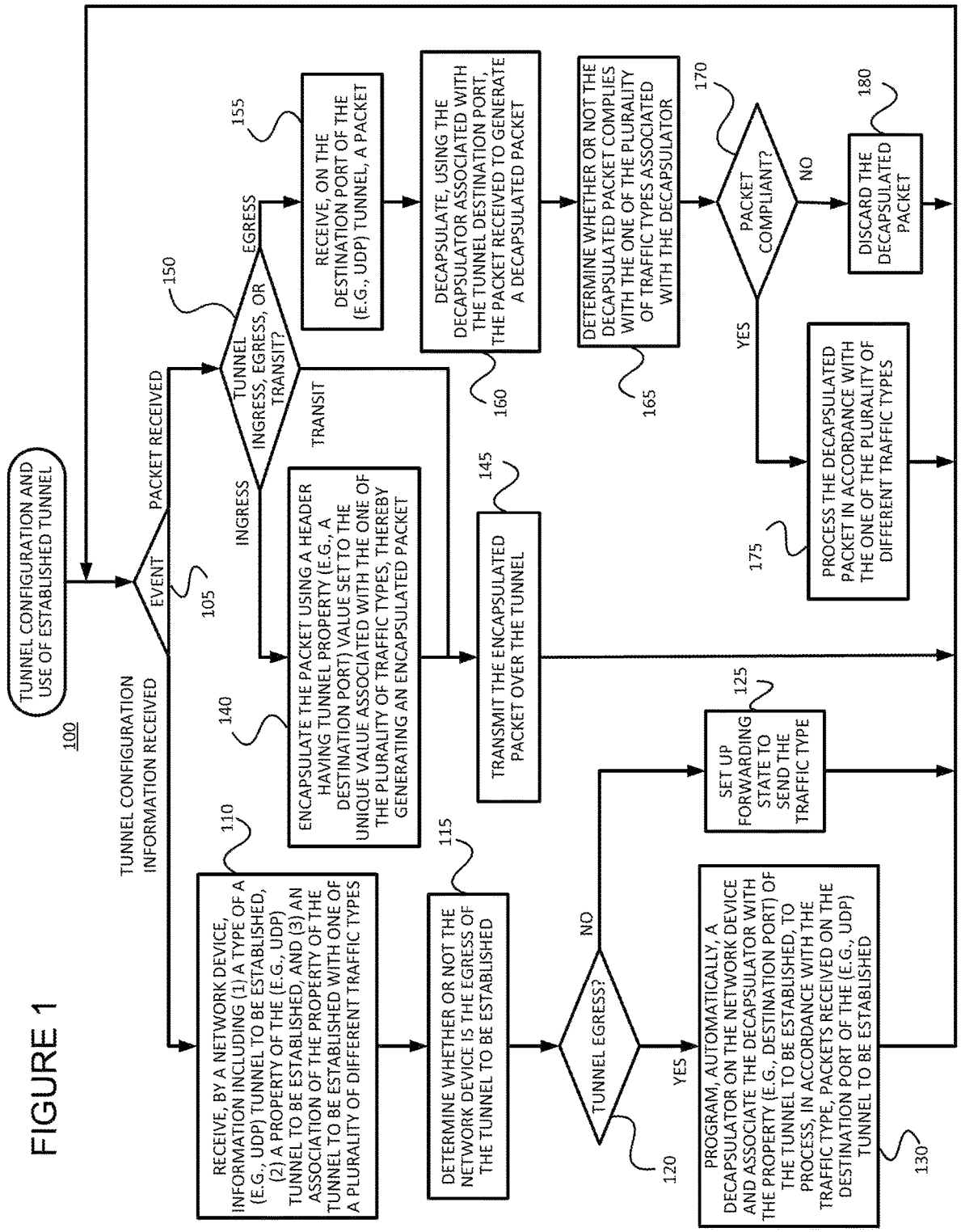
FIG. 1 is a flow diagram of an example computer-implemented method consistent with the present description, to be performed by network devices at the ingress of a tunnel, at the egress of a tunnel, and/or within the tunnel by a transit device.

FIG. 1 is a flow diagram of an example computer-implemented method consistent with the present description, to be performed on a network device, and in particular by network devices at the ingress of a tunnel, at the egress of a tunnel, and/or within the tunnel by a transit device. Control plane processing for configuring devices for establishing the tunnel, as well as data plane processing for forwarding a packet through the tunnel, are described.

Still referring to FIG. 1, different branches of the example method 100 are performed in response to the occurrence of different events. (Event condition 105) For example, the left-most branch of the example method 100 is performed responsive to receiving tunnel configuration information (e.g., from a central controller, via a user interface, from a tunnel egress device, etc.). More specifically, responsive to receiving tunnel configuration information, the example method 100 receives information including (1) a type of a (e.g., UDP) tunnel to be established, (2) a property (e.g., destination port value) of the (e.g., UDP) tunnel to be established, and (3) an association of the property of the tunnel to be established with one of a plurality of different protocols/traffic types (e.g., IPv4, IPv6, MPLS, SR, etc.). (Block 110) It is determined whether or not the network device is the egress of the (e.g., UDP) tunnel to be established. (Block 115) Responsive to a determination that the network device is at the egress of the tunnel to be established (Decision 120=YES), the example method 100 programs, automatically, a decapsulator on the network device and associates the decapsulator with the property (e.g., the UDP destination port) of the tunnel to be established, to process, in accordance with the traffic type, packets received on the destination port of the (e.g., UDP) tunnel to be established. (Block 130) Otherwise, responsive to a determination that the network device is not the egress of the tunnel to be established (Decision 120=NO), the example method 100 sets up forwarding state to send the traffic type. (Block 125) Setting up forwarding state may include setting up an encapsulator.

If the network device performing the example method 100 is at the ingress of the tunnel to be established, the information received may be sourced from the egress of the tunnel to be established. Alternatively, the information received may be sourced from a central controller.

In some example implementations of the example method, the property of the tunnel to be established is a destination port of the tunnel to be established. For example, if the tunnel to be established is a UDP tunnel, the property of the tunnel to be established may be a UPD destination port.

In some example implementations of the example method 100, the tunnel configuration information received by the network device is carried as a path attribute in a border gateway protocol (BGP) update message. For example, the information received by the network device may be carried in a tunnel encapsulation attribute (TEA) type-length-value (TLV). In such an implementation, the tunnel encapsulation attribute (TEA) TLV may include a tunnel destination port sub-TLV having a value specifying, via the received association, the one of the plurality of different traffic types, and/or the tunnel encapsulation attribute (TEA) TLV may include a tunnel encapsulation protocol sub-TLV having a value uniquely corresponding to, and associated with, the one of the plurality of different traffic types. Note that the BGP update message may include more than one association, each associating a specific traffic type with a specific destination port value.

Referring to the right branches of the example method 100 of FIG. 1, different branches of the example method 100 may be performed responsive to receiving a packet, depending on whether the example method 100 is being performed by a network device at the tunnel ingress, a network device at the tunnel egress, or a transit network device in the tunnel. Assume first that the example method 100 is being performed by a network device at the tunnel ingress. (Decision 150=INGRESS) In this case, the example method 100 encapsulates the received packet using a header having a tunnel property (e.g., the destination port) value set to the unique value associated with the one of the plurality of different traffic types, thereby generating an encapsulated packet. (Block 140) The example method 100 then transmits the encapsulated packet. (Block 145) On the other hand, assume that the example method 100 is being performed by a transit network device on the tunnel. (Decision 150=TRANSIT) In this case, the example method 100 transmits the encapsulated packet. (Block 145)

Finally, assume that the example method 100 is being performed by a network device at the tunnel egress. (Decision 150=EGRESS) In this case, the example method 100 receives the encapsulated packet (Block 155), decapsulates, using the previously programmed decapsulator (Recall Block 130), the packet received to generate a decapsulated packet (Block 160), and determines whether or not the decapsulated packet complies with the one of the plurality of traffic types corresponding to the decapsulator (Block 165). Responsive to determining that the decapsulated packet complies with the one of the plurality of different traffic types selected (Decision 170=YES), the example method 100 processes the decapsulated packet in accordance with the one of the plurality of different traffic types selected. (Block 175) On the other hand, responsive to determining that the decapsulated packet does not comply with the one of the plurality of different traffic types selected (Decision 170=NO), the example method 100 discards the decapsulated packet. (Block 180)

§ 5.2 Example Data Structures

Figure 2:
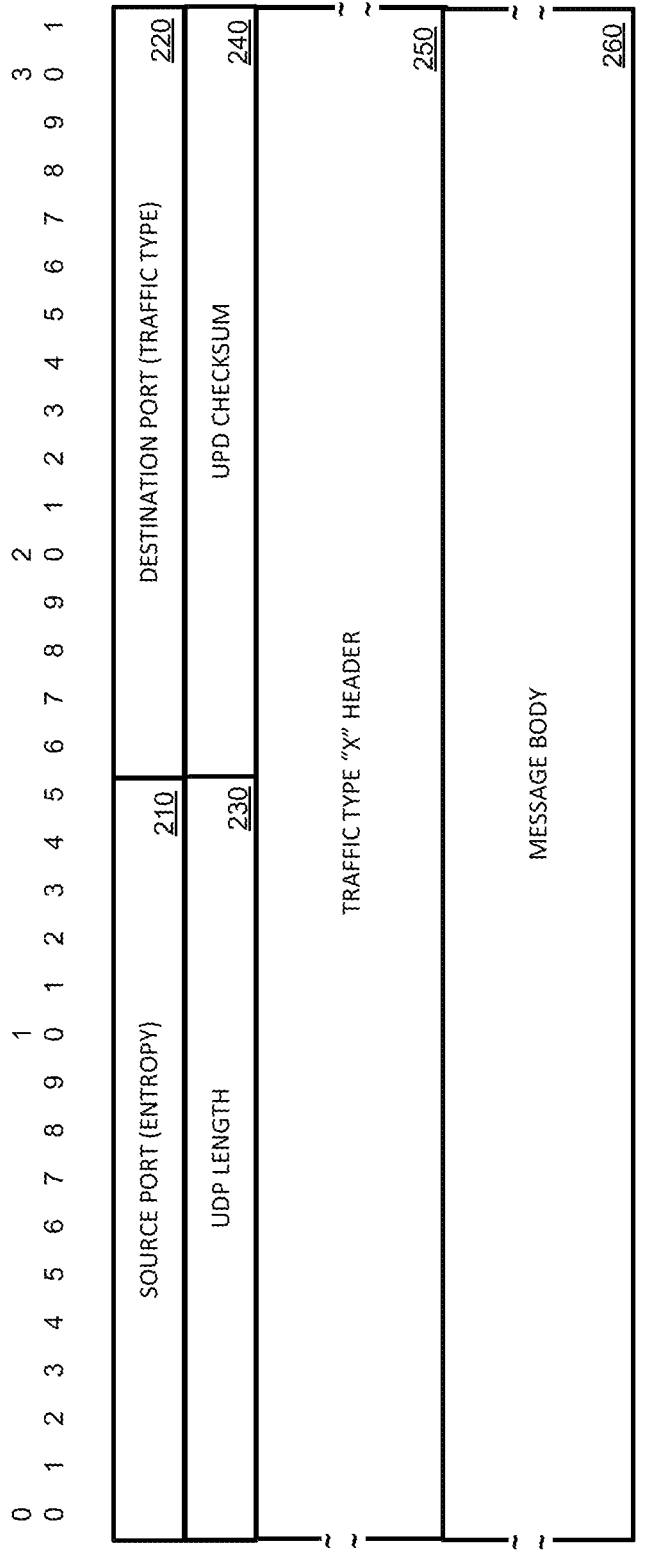
FIG. 2 illustrates an example data structure in an example implementation in which the tunnel is a UDP tunnel and in which a property of the tunnel used to distinguish different traffic types is a destination port.

FIG. 2 illustrates an example data structure 200 in an example implementation in which the tunnel is a UDP tunnel and in which the property of the tunnel used to distinguish different traffic types is a destination port.

§ 5.2.1 Source Port of UDP

Field 210 may be used to carry a 16-bit entropy value generated by the encapsulator to uniquely identify the flow. A flow is locally determined by the encapsulator. The algorithm to generate an entropy value can be a known or proprietary algorithm. If the tunnel does not need entropy, this field of all packets belonging to a given flow should be set to a (e.g., randomly selected) constant value in order to avoid packet reordering. The source port number value carried in this field 210 is in the range of 49512 to 65535 (to avoid using IANA reserved port numbers allocated (or reserved for future allocation) for specific applications/protocols).

§ 5.2.2 Destination Port of UDP

Field 220 is set to a configured value, defined by the network operator. The network operator should assign a port number based on the encapsulated protocol/traffic type (X) that can be processed post UDP decapsulation. The value carried in the destination port field 220 is used to map the UDP tunnel payload protocol/traffic type. The destination port number value carried in field 220 is in the range of 49512 to 65535 (to avoid using IANA reserved port numbers allocated (or reserved for further allocation) for specific applications/protocols).

§ 5.2.3 UDP Length

The usage of the UPD length field 230 is in accordance with the current UDP specification. (See, e.g., the document, Postel, J., et al., "User Datagram Protocol", *Request for Comments* (*RFC*) 768 (Internet Engineering Task Force (IETF), STD 6, RFC 768, August 1980) (referred to as "RFC 768" and incorporated herein by reference).

§ 5.2.4 UDP Checksum

The usage of field 240 usage depends on the protocol encapsulated in UDP. For IPv4 UDP encapsulation, this field is recommended to be set to zero as IPv4 header includes a checksum and use of the UDP checksum is optional with IPv4. For IPv6 UDP encapsulation, IPv6 header does not include a checksum, so this field should (and in some example implementations, must) contain a UDP checksum that should (and in some example implementations, must) be used as specified in RFC 768 and the document S. Deering, et al, "Internet Protocol, Version 6 (IPv6) Specification," *Request for Comments* (*RFC*): 2460 (Internet Engineering Task Force (IETF), December 1998) (referred to as "RFC 2460" and incorporated herein by reference) unless one of the exceptions that allows use of UDP zero-checksum mode (as specified in the document M. Eubanks, et al. "IPv6 and UDP Checksums for Tunneled Packet," *Request for Comments* (*RFC*): 6935 (Internet Engineering Task Force (IETF), April 2013)(referred to as "RFC 6935" and incorporated herein by reference) applies.

§ 5.2.5 Proto X Header

Part 250 of the example data structure 200 is a protocol/traffic type header of the packet encapsulated in UDP.

§ 5.2.6 Message Body

Part 260 of the example data structure 200 contains the message body.

§ 5.3 Example of Operation(s)

Figure 3A:
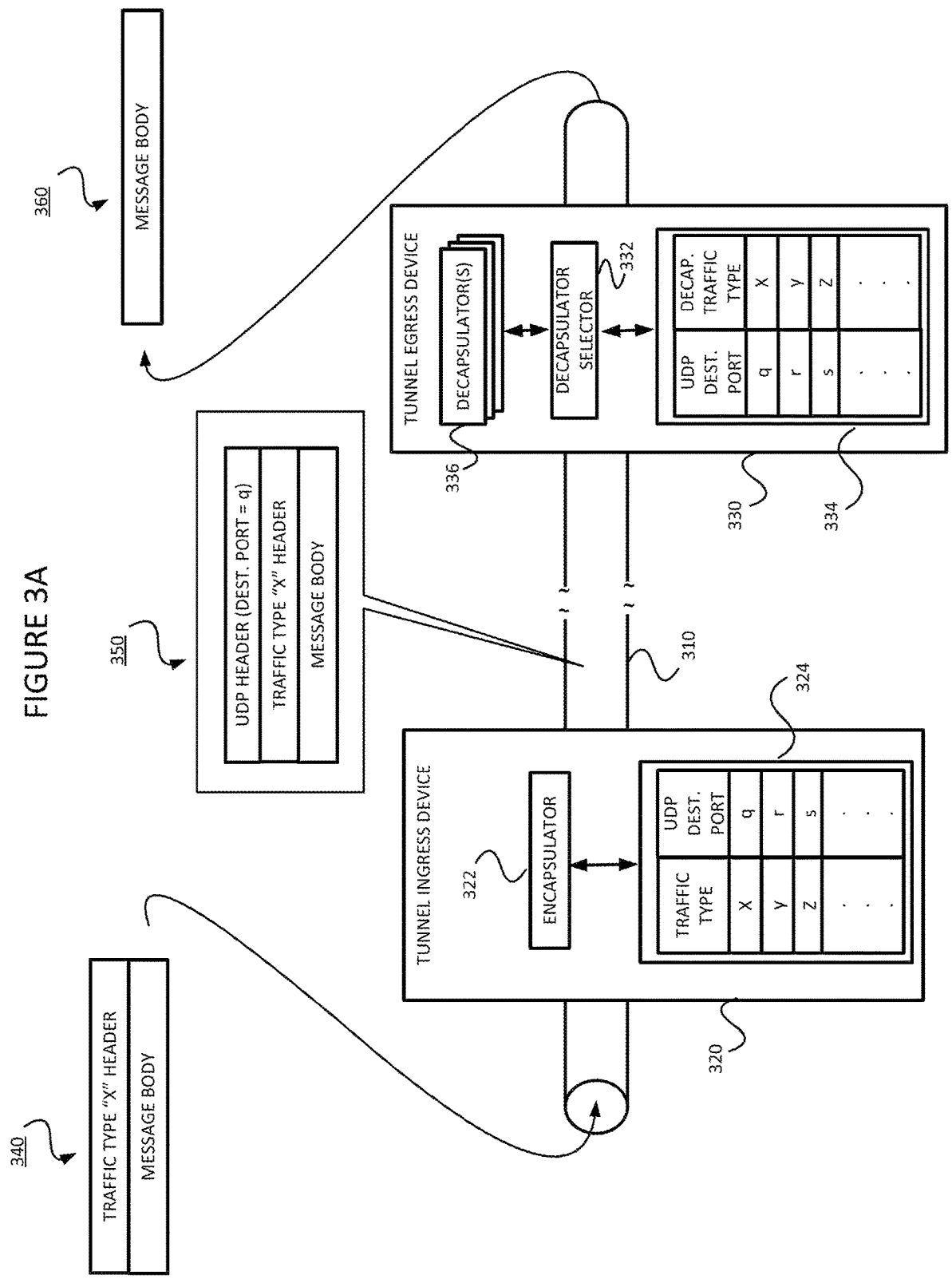
FIGS. 3A and 3B illustrate data plane handling of messages of different traffic types at the ingress and egress of a UPD tunnel.
Figure 3B:
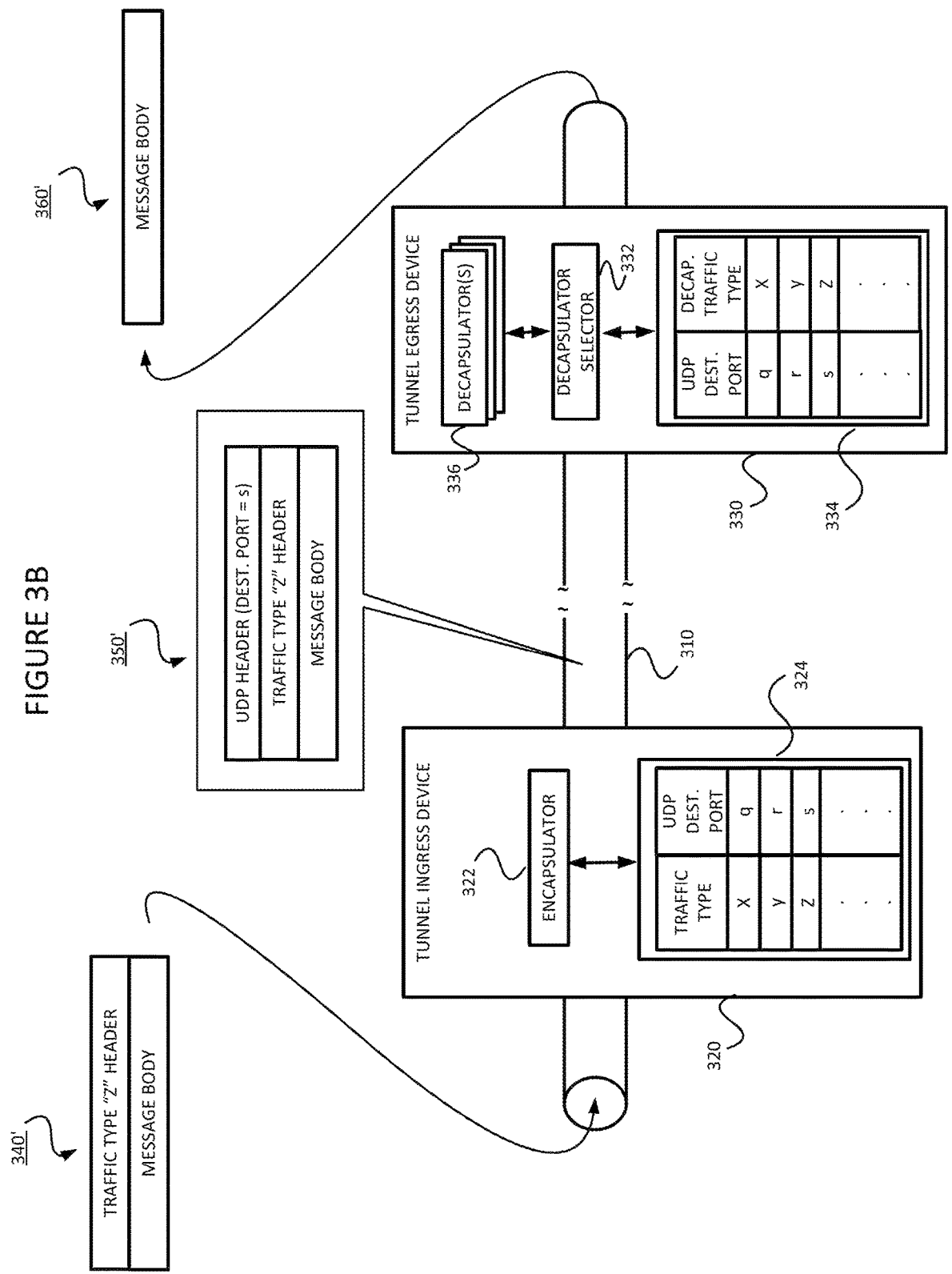

FIGS. 3A and 3B illustrate data plane handling of messages of different traffic types at the ingress and egress of UPD tunnels. UDP tunnel 310 is defined by a tunnel ingress device 320 and a tunnel egress device 330. There may be zero of more transit devices (not shown) on the UPD tunnel 310 between the tunnel ingress device 320 and the tunnel egress device 330. The tunnel ingress device 320 includes, among other things, an encapsulator 322 and a storage device or memory 324 storing an association of one or more protocols/traffic types (e.g., IPv4, IPv6, MPLS, SR, etc.) and UDP destination port numbers. The tunnel egress device 330 includes, among other things, a decapsulator selector 332, a storage device or memory 334 storing an association of one or more UDP destination port numbers and protocols/traffic types to be decapsulated, and one or more decapsulators 336. As should be appreciated, this example assumes that forwarding state has been programmed on the tunnel ingress device 320 and one or more decapsulators 336 have been programmed on the tunnel egress device 330. Note that in this example, the UDP destination port numbers are depicted with lower case letters (q, r, s, . . . ) for simplicity of illustration. The destination port number values should be in the range of 49512 to 65535.

Referring first to FIG. 3A, a message 340 with a traffic type "X" header arrives at the tunnel ingress device 320. The encapsulator 322 uses the traffic type header to look up a corresponding UDP destination port number. In this example, the UDP destination port number "q" is associated with traffic type "X". The message 350 output from the tunnel ingress device 320 corresponds to the original message 340 encapsulated with a UDP header in which the value of the UDP destination port is set to "q". (Recall, e.g., block 140 of FIG. 1.) (Note that the UDP source port may be provided with an entropy value (though this is not required), and the other UDP header fields may be populated, as already described above.) The message 350 may be forwarded over zero or more transit devices (not shown) on the UDP tunnel 310. (Recall, e.g., block 145 of FIG. 1.) When the message arrives at the tunnel egress device 330, the decapsulator selector 332 uses the UDP destination port value "q" to lookup the traffic type (in this case "X") to be decapsulated and to select the appropriate decapsulator 336 to decapsulate traffic type "X". The decapsulated message body 360 is output from the tunnel egress device 330. (Recall, e.g., blocks 160, 165 and 175 of FIG. 1.)

Referring next to FIG. 3B, a message 340' with a traffic type "Z" header arrives at the tunnel ingress device 320. The encapsulator 322 uses the traffic type header to look up a corresponding UDP destination port number. In this example, the UDP destination port number "s" is associated with traffic type "Z". The message 350' output from the tunnel ingress device 320 corresponds to the original message 340' encapsulated with a UDP header in which the value of the UDP destination port is set to "s". (Recall, e.g., block 140 of FIG. 1.) (Note that the UDP source port may be provided with an entropy value (though this is not required), and the other UDP header fields may be populated, as already described above.) The message 350' may be forwarded over zero or more transit devices (not shown) on the UDP tunnel 310. (Recall, e.g., block 145 of FIG. 1.) When the message arrives at the tunnel egress device 330, the decapsulator selector 332 uses the UDP destination port value "s" to lookup the traffic type (in this case "Z") to be decapsulated and to select the appropriate decapsulator 336 to decapsulate traffic type "Z". The decapsulated message body 360' is output from the tunnel egress device 330. (Recall, e.g., blocks 160, 165 and 175 of FIG. 1.)

Note that a network operator or administrator can associate different protocols/traffic types with different UDP destination ports as needed, on an ad hoc basis, without requiring registration with a governing body such as AINA.

The encapsulator 322 at the tunnel ingress device 320 should discard the packets other than the encapsulation protocol/traffic type. (Recall, e.g., block 180 of FIG. 1.) Source UDP port may be generated based on the entropy calculation algorithm at the source.

Each decapsulator 336 (or more specifically, the decapsulator selector 332) at the tunnel egress device 330 should discard the packets if the data field (UDP data) post UDP header does not match the protocol header (X) definition to which the destination port is mapped to.

§ 5.4 Example Apparatus

Figure 4:
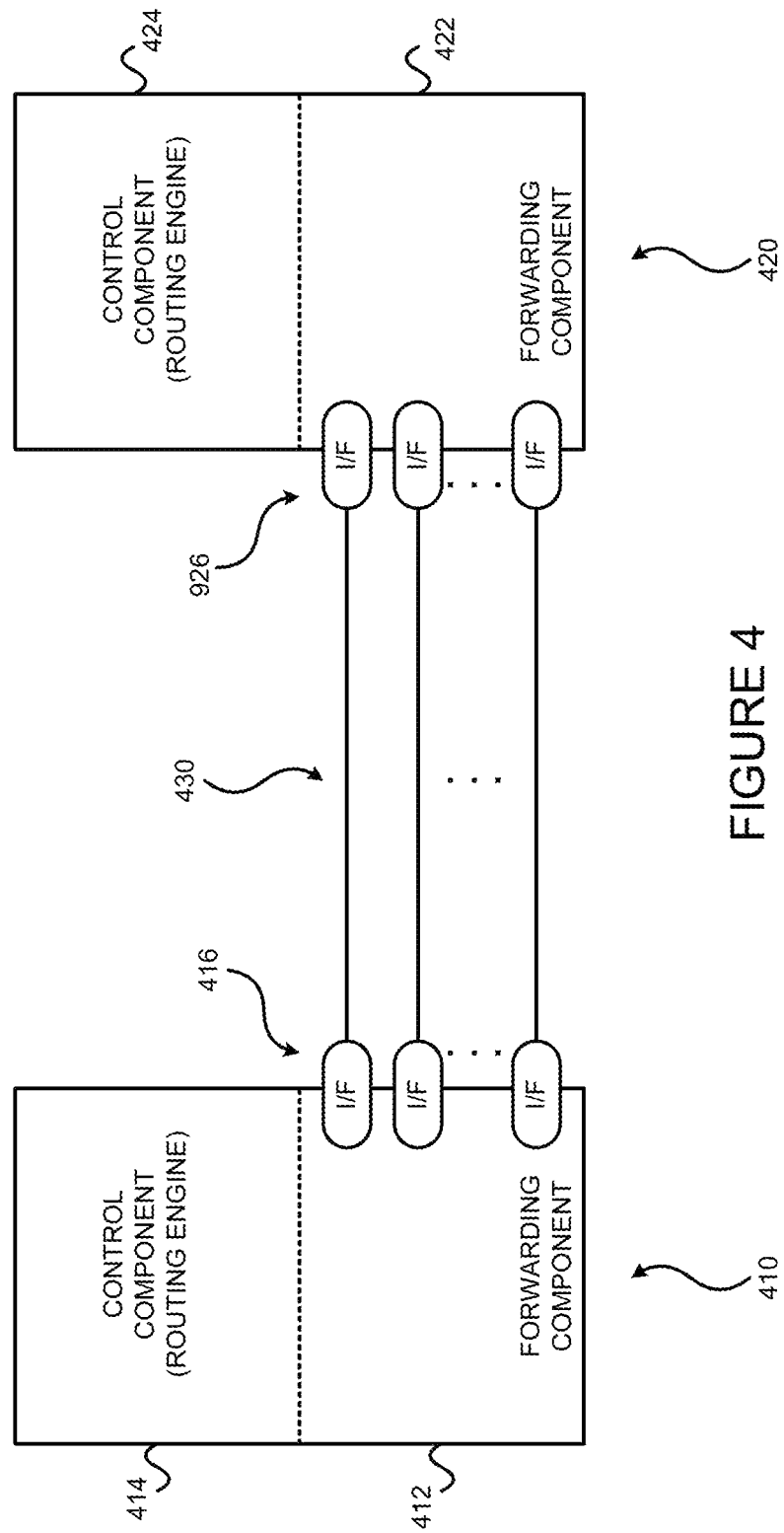
FIG. 4 illustrates two data forwarding systems, which may be used as nodes, coupled via communications links, in a communications network, such as communications network employing X-over-Y tunneling.

The data communications network devices implementing the example method 100 may be forwarding devices, such as routers for example. FIG. 4 illustrates two data forwarding systems 410 and 420 coupled via communications links 430. The links may be physical links or "wireless" links. The data forwarding systems 410,420 may be routers for example. If the data forwarding systems 410,420 are example routers, each may include a control component (e.g., a routing engine) 414,424 and a forwarding component 412,422. Each data forwarding system 410,420 includes one or more interfaces 416,426 that terminate one or more communications links 430.

As just discussed above, and referring to FIG. 5, some example routers 500 include a control component (e.g., routing engine) 510 and a packet forwarding component (e.g., a packet forwarding engine) 590.

The control component 510 may include an operating system (OS) kernel 520, routing protocol process(es) 530, label-based forwarding protocol process(es) 540, interface process(es) 550, user interface (e.g., command line interface) process(es) 560, and chassis process(es) 570, and may store routing table(s) 539, label forwarding information 545, and forwarding (e.g., route-based and/or label-based) table(s) 580. As shown, the routing protocol process(es) 530 may support routing protocols such as the routing information protocol ("RIP") 531, the intermediate system-to-intermediate system protocol ("IS-IS") 532, the open shortest path first protocol ("OSPF") 533, the enhanced interior gateway routing protocol ("EIGRP") 534 and the border gateway protocol ("BGP") 535, and the label-based forwarding protocol process(es) 540 may support protocols such as BGP 535, the label distribution protocol ("LDP") 536, the resource reservation protocol ("RSVP") 537, EVPN 538 and L2VPN 539. One or more components (not shown) may permit a user 565 to interact with the user interface process(es) 560. Similarly, one or more components (not shown) may permit an outside device to interact with one or more of the router protocol process(es) 530, the label-based forwarding protocol process(es) 540, the interface process(es) 550, and the chassis process(es) 570, via SNMP 585, and such processes may send information to an outside device via SNMP 585.

The packet forwarding component 590 may include a microkernel 592 over hardware components (e.g., ASICs, switch fabric, optics, etc.) 591, interface process(es) 593, ASIC drivers 594, chassis process(es) 595 and forwarding (e.g., route-based and/or label-based) table(s) 596.

Figure 5:
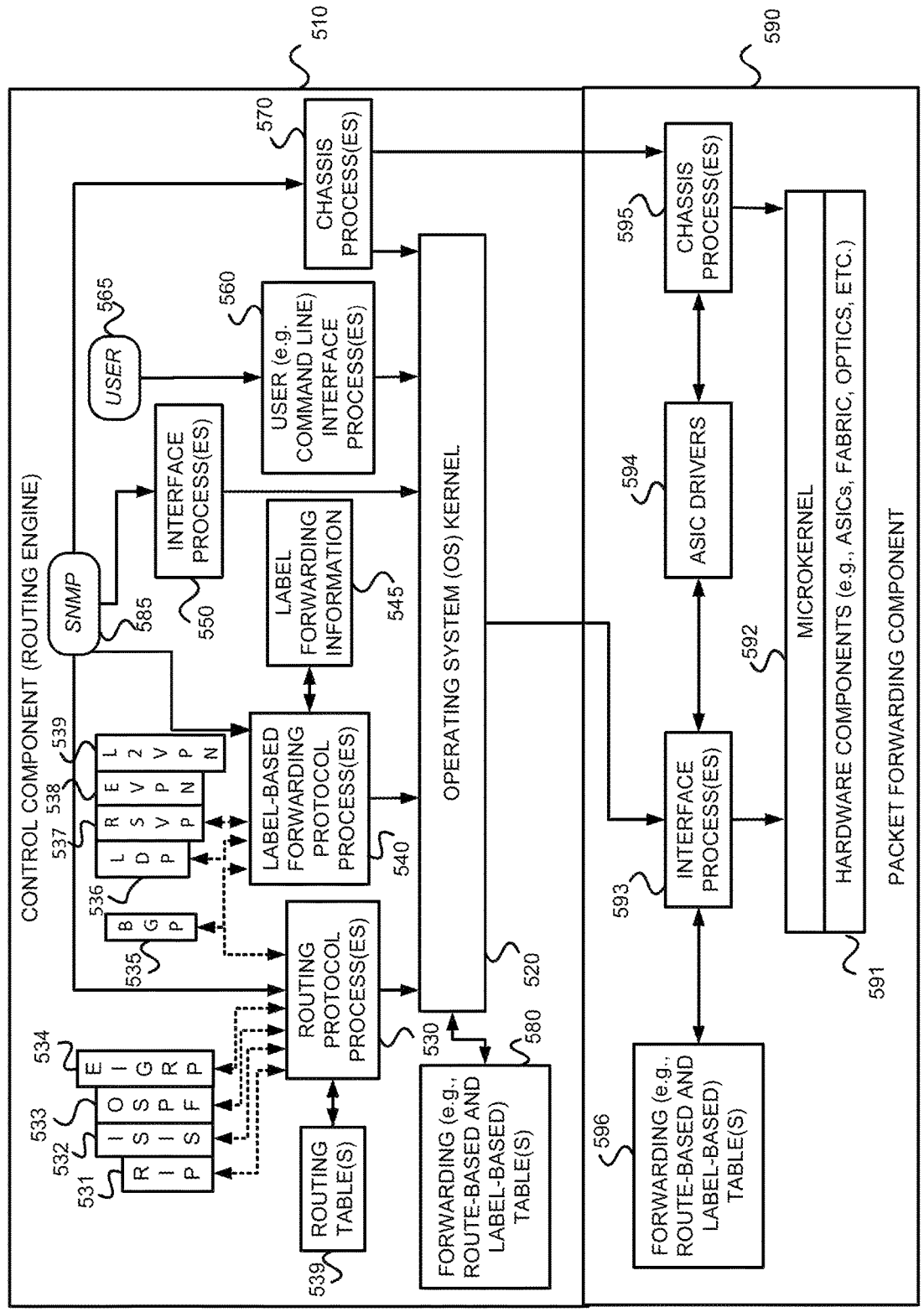
FIG. 5 is a block diagram of a router which may be used a communications network, such as communications network employing X-over-Y tunneling.

In the example router 500 of FIG. 5, the control component 510 handles tasks such as performing routing protocols, performing label-based forwarding protocols, control packet processing, etc., which frees the packet forwarding component 590 to forward received packets quickly. That is, received control packets (e.g., routing protocol packets and/or label-based forwarding protocol packets) are not fully processed on the packet forwarding component 590 itself, but are passed to the control component 510, thereby reducing the amount of work that the packet forwarding component 590 has to do and freeing it to process packets to be forwarded efficiently. Thus, the control component 510 is primarily responsible for running routing protocols and/or label-based forwarding protocols, maintaining the routing tables and/or label forwarding information, sending forwarding table updates to the packet forwarding component 590, and performing system management. The example control component 510 may handle routing protocol packets, provide a management interface, provide configuration management, perform accounting, and provide alarms. The processes 530, 540, 550, 560 and 570 may be modular, and may interact with the OS kernel 520. That is, nearly all of the processes communicate directly with the OS kernel 520. Using modular software that cleanly separates processes from each other isolates problems of a given process so that such problems do not impact other processes that may be running. Additionally, using modular software facilitates easier scaling.

Still referring to FIG. 5, the example OS kernel 520 may incorporate an application programming interface ("API") system for external program calls and scripting capabilities. The control component 510 may be based on an Intel PCI platform running the OS from flash memory, with an alternate copy stored on the router's hard disk. The OS kernel 520 is layered on the Intel PCI platform and establishes communication between the Intel PCI platform and processes of the control component 510. The OS kernel 520 also ensures that the forwarding tables 596 in use by the packet forwarding component 590 are in sync with those 580 in the control component 510. Thus, in addition to providing the underlying infrastructure to control component 510 software processes, the OS kernel 520 also provides a link between the control component 510 and the packet forwarding component 590.

Referring to the routing protocol process(es) 530 of FIG. 5, this process(es) 530 provides routing and routing control functions within the platform. In this example, the RIP 531, ISIS 532, OSPF 533 and EIGRP 534 (and BGP 535) protocols are provided. Naturally, other routing protocols may be provided in addition, or alternatively. Similarly, the label-based forwarding protocol process(es) 540 provides label forwarding and label control functions. In this example, the LDP 536, RSVP 537, EVPN 538 and L2VPN 539 (and BGP 535) protocols are provided. Naturally, other label-based forwarding protocols (e.g., MPLS, SR, etc.) may be provided in addition, or alternatively. In the example router 500, the routing table(s) 539 is produced by the routing protocol process(es) 530, while the label forwarding information 545 is produced by the label-based forwarding protocol process(es) 540.

Still referring to FIG. 5, the interface process(es) 550 performs configuration of the physical interfaces and encapsulation.

The example control component 510 may provide several ways to manage the router. For example, it 510 may provide a user interface process(es) 560 which allows a system operator 565 to interact with the system through configuration, modifications, and monitoring. The SNMP 585 allows SNMP-capable systems to communicate with the router platform. This also allows the platform to provide necessary SNMP information to external agents. For example, the SNMP 585 may permit management of the system from a network management station running software, such as Hewlett-Packard's Network Node Manager ("HP-NNM"), through a framework, such as Hewlett-Packard's Open View. Accounting of packets (generally referred to as traffic statistics) may be performed by the control component 510, thereby avoiding slowing traffic forwarding by the packet forwarding component 590.

Although not shown, the example router 500 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 560 via a console port, an auxiliary port, and/or a management Ethernet port.

The packet forwarding component 590 is responsible for properly outputting received packets as quickly as possible. If there is no entry in the forwarding table for a given destination or a given label and the packet forwarding component 590 cannot perform forwarding by itself, it 590 may send the packets bound for that unknown destination off to the control component 510 for processing. The example packet forwarding component 590 is designed to perform Layer 2 and Layer 3 switching, route lookups, and rapid packet forwarding.

As shown in FIG. 5, the example packet forwarding component 590 has an embedded microkernel 592 over hardware components 591, interface process(es) 593, ASIC drivers 594, and chassis process(es) 595, and stores a forwarding (e.g., route-based and/or label-based) table(s) 596. The microkernel 592 interacts with the interface process(es) 593 and the chassis process(es) 595 to monitor and control these functions. The interface process(es) 592 has direct communication with the OS kernel 520 of the control component 510. This communication includes forwarding exception packets and control packets to the control component 510, receiving packets to be forwarded, receiving forwarding table updates, providing information about the health of the packet forwarding component 590 to the control component 510, and permitting configuration of the interfaces from the user interface (e.g., CLI) process(es) 560 of the control component 510. The stored forwarding table(s) 596 is static until a new one is received from the control component 510. The interface process(es) 593 uses the forwarding table(s) 596 to look up next-hop information. The interface process(es) 593 also has direct communication with the distributed ASICs. Finally, the chassis process(es)

595 may communicate directly with the microkernel 592 and with the ASIC drivers 594.

Figure 6:
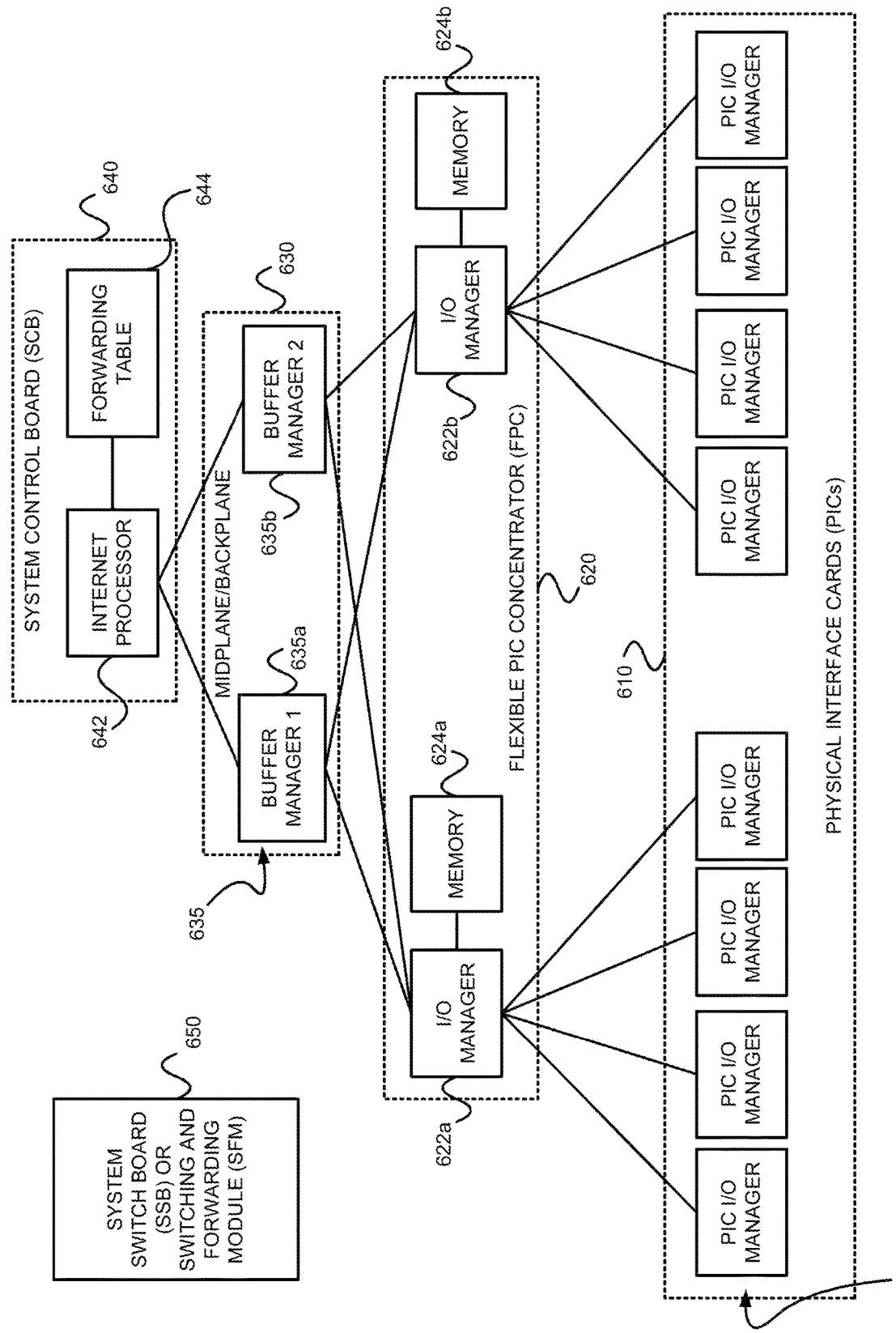
FIG. 6 is an example architecture in which ASICS may be distributed in a packet forwarding component to divide the responsibility of packet forwarding.

FIG. 6 is an example of how the ASICS may be distributed in the packet forwarding component 590 to divide the responsibility of packet forwarding. As shown in FIG. 6, the ASICs of the packet forwarding component 590 may be distributed on physical interface cards ("PICs") 610, flexible PIC concentrators ("FPCs") 620, a midplane or backplane 630, and a system control board(s) 640 (for switching and/or forwarding). Switching fabric is also shown as a system switch board ("SSB"), or a switching and forwarding module ("SFM") 650 (which may be a switch fabric 650' as shown in FIGS. 7A and 7B). Each of the PICs 610 includes one or more PIC I/O managers 615. Each of the FPCs 620 includes one or more I/O managers 622, each with an associated memory 624 (which may be a RDRAM 624' as shown in FIGS. 7A and 7B). The midplane/backplane 630 includes buffer managers 635a, 635b. Finally, the system control board 640 includes an internet processor 642 and an instance of the forwarding table 644 (Recall, e.g., 596 of FIG. 5).

Still referring to FIG. 6, the PICs 610 contain the interface ports. Each PIC 610 may be plugged into an FPC 620. Each individual PIC 610 may contain an ASIC that handles media-specific functions, such as framing or encapsulation. Some example PICs 610 provide SDH/SONET, ATM, Gigabit Ethernet, Fast Ethernet, and/or DS3/E3 interface ports.

An FPC 620 can contain one or more PICs 610, and may carry the signals from the PICs 610 to the midplane/backplane 630 as shown in FIG. 6.

The midplane/backplane 630 holds the line cards. The line cards may connect into the midplane/backplane 630 when inserted into the example router's chassis from the front. The control component (e.g., routing engine) 510 may plug into the rear of the midplane/backplane 630 from the rear of the chassis. The midplane/backplane 630 may carry electrical (or optical) signals and power to each line card and to the control component 510.

The system control board 640 may perform forwarding lookup. It 640 may also communicate errors to the routing engine. Further, it 640 may also monitor the condition of the router based on information it receives from sensors. If an abnormal condition is detected, the system control board 640 may immediately notify the control component 510.

Referring to FIGS. 6, 7A and 7B, in some exemplary routers, each of the PICs 610,610' contains at least one I/O manager ASIC 615 responsible for media-specific tasks, such as encapsulation. The packets pass through these I/O ASICs on their way into and out of the router. The I/O manager ASIC 615 on the PIC 610,610' is responsible for managing the connection to the I/O manager ASIC 622 on the FPC 620,620', managing link-layer framing and creating the bit stream, performing cyclical redundancy checks (CRCs), and detecting link-layer errors and generating alarms, when appropriate. The FPC 620 includes another I/O manager ASIC 622. This ASIC 622 (shown as a layer 2/layer 3 packet processing component 610'/620') takes the packets from the PICs 610 and breaks them into (e.g., 74-byte) memory blocks. This FPC I/O manager ASIC 622 (shown as a layer 2/layer 3 packet processing component 610'/620') sends the blocks to a first distributed buffer manager (DBM) 935a (shown as switch interface component 635a'), decoding encapsulation and protocol-specific information, counting packets and bytes for each logical circuit, verifying packet integrity, and applying class of service (CoS) rules to packets. At this point, the packet is first written to memory. More specifically, the example DBM ASIC 635/635a' manages and writes packets to the shared memory 624 across all FPCs 620. In parallel, the first DBM ASIC 635/635a' also extracts information on the destination of the packet and passes this forwarding-related information to the Internet processor 642/642' The Internet processor 642/642' performs the route lookup using the forwarding table 644 and sends the information over to a second DBM ASIC 635b'. The Internet processor ASIC 642/642' also collects exception packets (i.e., those without a forwarding table entry) and sends them to the control component 510. The second DBM ASIC 625 (shown as a queuing and memory interface component 635b') then takes this information and the 74-byte blocks and forwards them to the I/O manager ASIC 622 of the egress FPC 620/620' (or multiple egress FPCs, in the case of multicast) for reassembly. (Thus, the DBM ASICs 635a/635a' and 635b/635b' are responsible for managing the packet memory 624/624' distributed across all FPCs 620/620', extracting forwarding-related information from packets, and instructing the FPC where to forward packets.)

The I/O manager ASIC 622 on the egress FPC 620/620' may perform some value-added services. In addition to incrementing time to live ("TTL") values and re-encapsulating the packet for handling by the PIC 610, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 622 on the egress FPC 620/620' may be responsible for receiving the blocks from the second DBM ASIC 635/635', incrementing TTL values, queuing a pointer to the packet, if necessary, before applying CoS rules, re-encapsulating the blocks, and sending the encapsulated packets to the PIC I/O manager ASIC 615.

Figure 8:
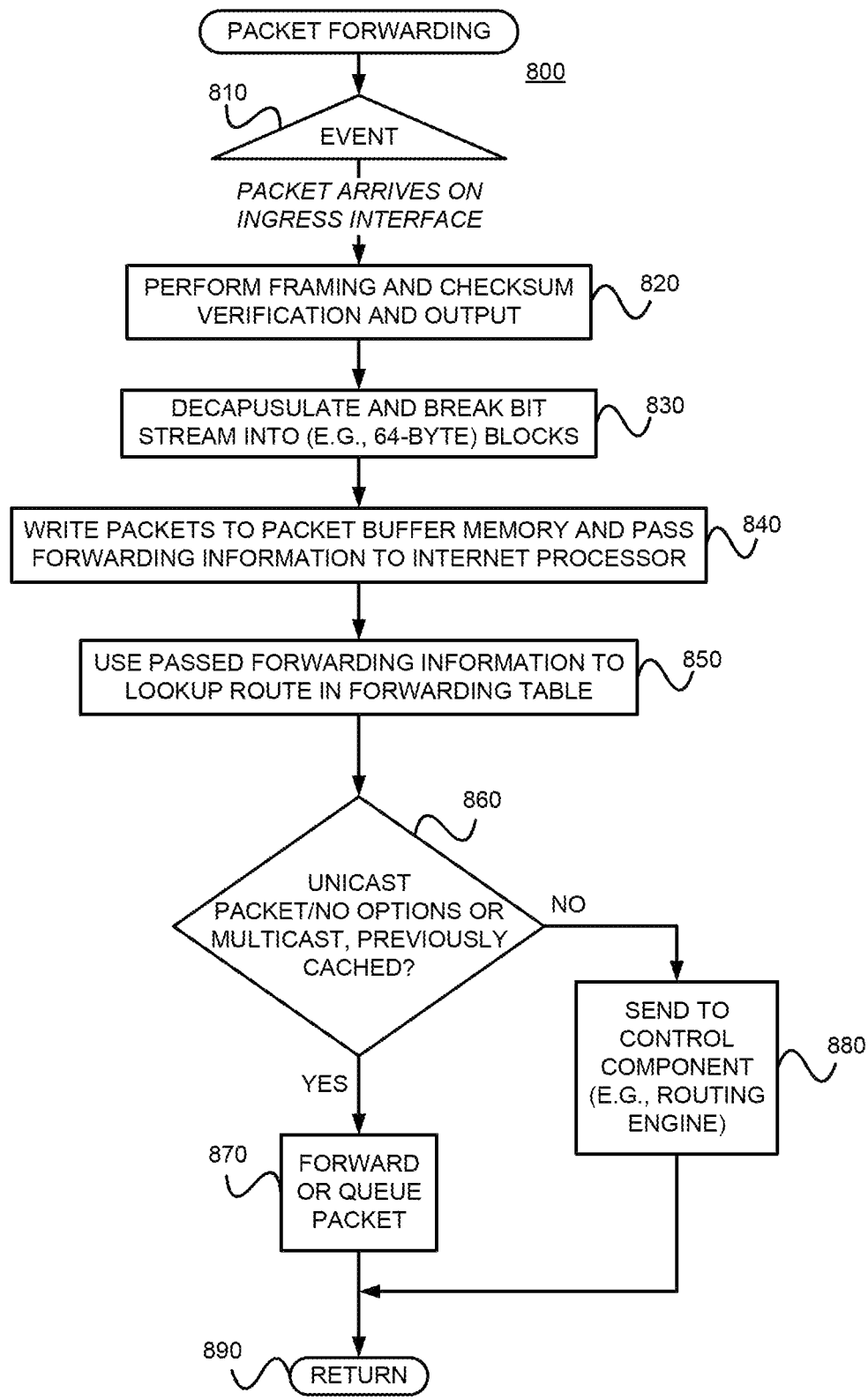
FIG. 8 is a flow diagram of an example method for providing packet forwarding in an example router.

FIG. 8 is a flow diagram of an example method 800 for providing packet forwarding in the example router. The main acts of the method 800 are triggered when a packet is received on an ingress (incoming) port or interface. (Event 810) The types of checksum and frame checks that are required by the type of medium it serves are performed and the packet is output, as a serial bit stream. (Block 820) The packet is then decapsulated and parsed into (e.g., 64-byte) blocks. (Block 830) The packets are written to buffer memory and the forwarding information is passed on the Internet processor. (Block 840) The passed forwarding information is then used to lookup a route in the forwarding table. (Block 850) Note that the forwarding table can typically handle unicast packets that do not have options (e.g., accounting) set, and multicast packets for which it already has a cached entry. Thus, if it is determined that these conditions are met (YES branch of Decision 860), the packet forwarding component finds the next hop and egress interface, and the packet is forwarded (or queued for forwarding) to the next hop via the egress interface (Block 870) before the method 800 is left (Node 890) Otherwise, if these conditions are not met (NO branch of Decision 860), the forwarding information is sent to the control component 510 for advanced forwarding resolution (Block 880) before the method 800 is left (Node 890).

Referring back to block 870, the packet may be queued. Actually, as stated earlier with reference to FIG. 6, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 622 may send a request for the packet to the second DBM ASIC 635b. The DBM ASIC 635 reads the blocks from shared memory and sends them to the I/O manager ASIC 622 on the FPC 620, which then serializes the bits and sends them to the media-specific ASIC of the egress interface. The I/O manager ASIC 615 on the egress PIC 610 may apply the physical-layer framing, perform the CRC, and send the bit stream out over the link.

Referring back to block 880 of FIG. 8, as well as FIG. 6, regarding the transfer of control and exception packets, the system control board 640 handles nearly all exception packets. For example, the system control board 640 may pass exception packets to the control component 510.

Although example embodiments consistent with the present description may be implemented on the example routers of FIG. 4 or 5, embodiments consistent with the present description may be implemented on communications network nodes (e.g., routers, switches, etc.) having different architectures. More generally, embodiments consistent with the present description may be implemented on an example system 800 as illustrated on FIG. 9.

Figure 9:
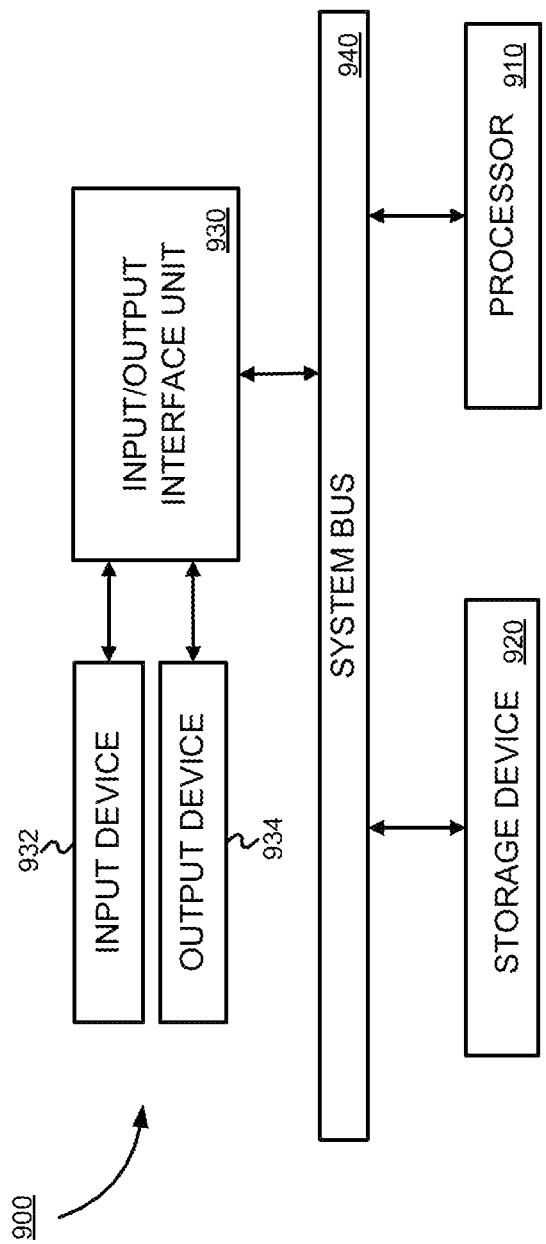
FIG. 9 is a block diagram of an exemplary machine that may perform one or more of the processes described, and/or store information used and/or generated by such processes.

FIG. 9 is a block diagram of an exemplary machine 900 that may perform one or more of the processes described, and/or store information used and/or generated by such processes. The exemplary machine 900 includes one or more processors 910, one or more input/output interface units 930, one or more storage devices 920, and one or more system buses and/or networks 940 for facilitating the communication of information among the coupled elements. One or more input devices 932 and one or more output devices 934 may be coupled with the one or more input/output interfaces 930. The one or more processors 910 may execute machine-executable instructions (e.g., C or C++ running on the Linux operating system widely available from a number of vendors) to effect one or more aspects of the present description. At least a portion of the machine executable instructions may be stored (temporarily or more permanently) on the one or more storage devices 920 and/or may be received from an external source via one or more input interface units 930. The machine executable instructions may be stored as various software modules, each module performing one or more operations. Functional software modules are examples of components of the present description.

In some embodiments consistent with the present description, the processors 910 may be one or more microprocessors and/or ASICs. The bus 940 may include a system bus. The storage devices 920 may include system memory, such as read only memory (ROM) and/or random access memory (RAM). The storage devices 920 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present description may also be provided as a machine-readable medium for storing the machine-executable instructions. The machine-readable medium may be non-transitory and may include, but is not limited to, flash memory, optical disks, CD-ROMs, DVD ROMs, RAMS, EPROMs, EEPROMs, magnetic or optical cards or any other type of machine-readable media suitable for storing electronic instructions. For example, example embodiments consistent with the present description may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present description (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present description (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§ 5.5 Alternatives, Extensions, and/or Refinements

§ 5.5.1 Entropy for Load Balancing

Most existing routers are capable of flow control using UDP five-tuple (Source IP address, destination IP address, source port, destination port, and protocol). As noted above, UDP source port can be used as entropy for consistent hashing providing fine-grained load-balancing for the encapsulated protocol (say X), though this is not necessary.

§ 5.5.2 Port Mapping

Network operators should (and in some example implementations, must) clearly configure the port mapping for the encapsulated protocol (also referred to more generally as "traffic type"), both at the source and destination of the X-in-UDP tunnel. Any mismatch will lead to unintended behavior as the UDP packet may be processed at a different port.

The UDP destination port should be mapped to the encapsulated protocol/traffic type (X) so that further protocol (X) processing can occur after decapsulation. For example, if an IPv4 packet is encapsulated at the source of a tunnel using UDP with a destination of port number 49567, the UDP tunnel destination should have the port mapping for the above port to protocol IPv4, thus enabling a packet lookup based on IPv4 forwarding table for further processing.

The traffic type may include, for example, protocol types, which indicate the type of data found in the payload portion of the datagram. A "protocol type" value provides a demultiplexing feature so that the datagram can be used to carry payloads of more than one protocol type. Although this field originally specified the transport-layer protocol the datagram is encapsulating, it now can identify the encapsulated protocol, which may or not be a transport protocol.

§ 5.5.3 Configuration

Network operators should (and in some example implementations, must) use port numbers always in the range 49152 to 66635 (as ports less than 49512 are reserved by IANA to identify specific applications/protocols) for X-in-UDP encapsulation. The mapping associating destination port number and the encapsulated protocol (X) should (and in some example implementations, must) be clearly configured on the tunnel destination. Firewall or packet filters may be used to discard any UDP packet received on the mapped port with an unidentified protocol (different from the configured encapsulated protocol).

Configuration should (and in some example implementations, must) be made on the tunnel source, defining the encapsulated protocol (X). Only packets of protocol (X) configured at the tunnel source should (and in some example implementations, must) be encapsulated using X-in-UDP tunnels (i.e., any protocol packet other than the one defined in source port map should be discarded). X-in-UDP encapsulation needs the following information to tunnel packets of protocol(X).

i) Tunnel Source address (Source IP address of the UDP tunnel).

ii) Tunnel Endpoint (IP address of the remote tunnel endpoint/egress).

iii) Source UDP port.

iv) Destination UDP port.

v) Encapsulated Protocol (protocol or traffic type of the packet encapsulated in UDP tunnel)

This information can either be manually configured by the network operator or signaled using BGP Tunnel Encapsulation Attribute per K. Patel, et al., "The BGP Tunnel Encapsulation Attribute," *Request for Comments (RFC)* 9012 (Internet Engineering Task Force (IETF), April 2021) (referred to as "RFC 9012" and incorporated herein by reference), as updated in section 5.5.3.1 below.

§ 5.5.3.1 Configuration Using BGP Signaling

In some example implementations, a BGP speaker includes a tunnel encapsulation attribute (referred to as "TEA") in some route updates. The TEA may include one or more UDP tunnels. This UDP tunnel type, that can be used to tunnel many types of traffic, is an improvement over conventional protocols. For example, an X-in-UDP tunnel type may be registered (though not necessarily with IANA) and used in a TEA, where X is any inner protocol. Allowing flexible use of a UDP tunnel without having to register with IANA for the inner protocol type(s) is advantageous, especially in networks managed by a single administrator or administrative entity.

In some example implementations, the UDP tunnel may include a protocol type sub-TLV and UDP destination port sub-TLV. For example, the tunnel type may be set to 26, and the sub-TLVs may be used for different traffic types (TTs) (e.g., {TTa, TTb, TTc, . . . }, where a, b, c, . . . are different types of traffic).

When a route update is sent from controllers (and not from egress), the TEA can also be used for the egress to automatically set up decapsulation state. (Typically, the TEA is used by ingress to set up encapsulation.) That is, in some example implementations, if a receiving router of the BGP update is the tunnel endpoint, it sets up tunnel decapsulation state accordingly. In this way, the receiving router does not need to rely on manual provisioning. In some example implementations, the originating BGP speaker is a controller or controlled by a controller.

In some example implementations, a receiving ingress router tunnels traffic (of the specified protocol type) using UDP with the specified parameters (like the destination UDP port).

The BGP Tunnel Encapsulation Attribute in RFC 9012 defines path attribute known as the "Tunnel Encapsulation attribute" to provide information needed to create tunnels and their corresponding encapsulation headers. X-in-UDP encapsulation can be signaled using BGP tunnel encapsulation attribute. A new tunnel type "X-in-UDP" will be used for "Tunnel Type" in the Tunnel Encapsulation Attribute.

X-in-UDP tunnel endpoint address may be encapsulated using the Tunnel Encapsulation Attribute sub-TLV as defined in section 3.1 of RFC 9012.

X-in-UDP tunnel UDP destination port may be encapsulated using the UDP Destination Port (Type Code 8) sub-TLV as defined in section 3.3.2 of RFC 9012.

X-in-UDP tunnel encapsulation protocol (i.e., the protocol type or traffic type of the data part in a UDP packet) may be encapsulated using the Protocol Type Sub-TLV (Type Code 2) sub-TLV defined in section 3.4.1 of RFC 9012.

A new tunnel type (X-in-UDP) should be assigned for "Tunnel Type" in the Tunnel Encapsulation Attribute.

§ 5.5.4 Applicability

X-in-UDP (Any in UDP) encapsulation mechanism should (and in some example implementations, must) only be deployed within a single network (with a single network operator) or networks administered by cooperating network operators where traffic is managed to avoid congestion and secure. Furthermore, packet or firewall filters should be added to prevent these X-in-UDP packets from escaping the network due to misconfiguration or packet errors.

§ 5.5.5 Security Considerations

The example UDP encapsulation format described here cannot ensure the integrity of the data packets encapsulated through these UDP tunnels. UDP tunnel decapsulators cannot authenticate the source of the tunnel (i.e., it cannot authenticate the encapsulator). In cases where security is of major concern, X-in-UDP should be secured through Datagram Transport Layer Security (DTLS) as specified in E. Rescorla et al., "Datagram Transport Layer Security Version 1.2," *Request for Comments (RFC)*: 6347 (Internet Engineering Task Force (IETF), January 2012) (referred to as "RFC 6347" and incorporated herein by reference) or other application specific security protocols. (IPsec may not be used for security here as UDP header (five-tuple) cannot be used for flow control due to the encapsulation of whole contents of IP packet.)

X-in-UDP tunnels will have the same or similar security problems as of other UDP tunnels such as MPLS-in-UDP as described in RFC 7510. Use of IPsec (e.g., as described in S. Kent, et al., "Security Architecture for the Internet Protocol," *Request for Comments (RFC)*; 4301 (Internet Engineering Task Force (IETF), December 2005)(referred to as "RFC 4301" and incorporated herein by reference)) for end-to-end security of X-in-UDP tunnels is not recommended as the intermediate routers cannot peek into the UDP header. Hence, RFC 6347 or other application security protocols should be used.

§ 5.5.6 Extension to Other Types of Tunnels

Although example embodiments were described supporting X in-UDP tunnels (where "X" is a traffic type), such methods can be extended to other types of tunnels, such as X in GMPLS for example (generally referred to as "X-in-Y tunnel" or simply "X-in Y").

§ 5.6 Conclusions

Example embodiments consistent with the present description provide a generic encapsulation mechanism for any user configured protocol (say X), not restricted to a specific pre-defined UDP destination port (such as in MPLS-in-UDP as defined in RFC 7510). The present description describes a generic UDP encapsulation mechanism for any user configured protocol (IPv4-in-UDP, IPv6-in-UDP, MPLS-in-UDP etc.), which allows a fine-grained load balancing over IP networks over Equal-Cost Multipath. This scheme of encapsulation using UDP provides greater flexibility to network operators in defining clear port mappings for configured protocols and at the same time leveraging the UDP port numbers for flow-control. UDP source port number can be used as an entropy field for better flow control as most of the existing routers are capable of distributing IP traffic based on the hash of five-tuple of UDP (See, e.g., RFC 768.) (i.e., Source IP address, destination IP address, source port, destination port, and protocol).

What is claimed is:

1. A computer-implemented method for use by a network device, the computer-implemented method comprising:
    a) receiving, by the network device, information including (1) a type of a tunnel to be established, (2) a property of the tunnel to be established, and (3) an association of the property of the tunnel to be established with one of a plurality of different traffic types;
    b) determining whether or not the network device is the egress of the tunnel to be established; and
    c) responsive to a determination that the network device is at the egress of the tunnel to be established, programming, automatically, a decapsulator on the network device and associating the decapsulator with the property of the tunnel to be established, to process, in accordance with the traffic type, packets received on the destination port of the tunnel to be established, and
    otherwise, responsive to a determination that the network device is not the egress of the tunnel to be established, setting up forwarding state to send the traffic type,
    wherein information received by the network device is carried as a path attribute in a BGP update message,
    wherein the information received by the network device is carried in a tunnel encapsulation attribute TLV, and
    wherein the tunnel encapsulation attribute TLV includes (A) a tunnel destination port sub-TLV having a value specifying, via the received association, the one of the plurality of different traffic types, and/or (B) a tunnel encapsulation protocol sub-TLV having a value uniquely corresponding to, and associated with, the one of the plurality of different traffic types.

2. The computer-implemented method of claim 1, wherein the information received is sourced from a central controller.

3. The computer-implemented method of claim 1, wherein the network device is an ingress of the tunnel to be established, and
    wherein the information received is sourced from the egress of the tunnel to be established.

4. The computer-implemented method of claim 1, wherein the property of the tunnel to be established is a destination port of the tunnel to be established.

5. The computer-implemented method of claim 1, wherein the tunnel to be established is a UDP tunnel and wherein the property of the tunnel to be established is a UDP destination port.

6. The computer-implemented method of claim 1, further comprising:
    d) receiving, by the network device, further information including (1) the type of a second tunnel to be established, (2) the property of the second to be established, and (3) an association of the property of the second tunnel to be established with a different one of a plurality of different traffic types to be carried by the second tunnel to be established;
    e) determining whether or not the network device is the egress of the second tunnel to be established; and
    f) responsive to a determination that the network device is the egress of the second tunnel to be established, programming, automatically, a second decapsulator on the network device and associated with a destination port, to process, in accordance with the different traffic type, packets received on the destination port of the second tunnel to be established, and
    otherwise, responsive to a determination that the network device is not the egress of the second tunnel to be established, setting up forwarding state to send the different traffic type.

7. The computer-implemented method of claim 1, wherein the tunnel is established, the computer-implemented method further comprising:
    d) receiving, on a device at the destination of the tunnel, a packet;
    e) decapsulating, using the decapsulator, the packet received to generate a decapsulated packet;
    f) determining whether or not the decapsulated packet complies with the one of the plurality of traffic types selected; and
    g) responsive to determining that the decapsulated packet does not comply with the one of the plurality of different traffic types selected, discarding the decapsulated packet, and
    otherwise, responsive to determining that the decapsulated packet complies with the one of the plurality of different traffic types selected, processing the decapsulated packet in accordance with the one of the plurality of different traffic types selected.

8. The computer-implemented method of claim 1 wherein the tunnel to be established is a UDP tunnel.

9. A network device comprising:
    a) at least one processor; and
    b) a computer-readable storage medium storing program instructions which, when executed by the at least one processor, cause the at least one processor to perform a method including
        1) Receiving, by the network device, information including (i) a type of a tunnel to be established, (ii) a property of the tunnel to be established, and (iii) an association of the property of the tunnel to be established with one of a plurality of different traffic types,
        2) determining whether or not the network device is the egress of the tunnel to be established, and
        3) Responsive to a determination that the network device is at the egress of the tunnel to be established, programming, automatically, a decapsulator on the network device and associating the decapsulator with the property of the tunnel to be established, to process, in accordance with the traffic type, packets received on the destination port of the tunnel to be established, and
        otherwise, responsive to a determination that the network device is not the egress of the tunnel to be established, setting up forwarding state to send the traffic type,
        wherein information received by the network device is carried as a path attribute in a BGP update message,
        wherein the information received by the network device is carried in a tunnel encapsulation attribute TLV, and
        wherein the tunnel encapsulation attribute TLV includes (A) a tunnel destination port sub-TLV having a value specifying, via the received association, the one of the plurality of different traffic types, and/or (B) a tunnel encapsulation protocol sub-TLV having a value uniquely corresponding to, and associated with, the one of the plurality of different traffic types.

10. The network device of claim 9, wherein the information received is sourced from a central controller.

11. The network device of claim 9, wherein the network device is an ingress of the tunnel to be established, and
wherein the information received is sourced from the egress of the tunnel to be established.

12. The network device of claim 9, wherein the tunnel to be established is a UDP tunnel and wherein the property of the tunnel to be established is a UDP destination port.

13. A non-transitory computer-readable medium storing processor-executable instructions which, when executed by at least one processor of a network device, cause the network device to perform a method comprising:
   a) receiving, by the network device, information including (1) a type of a tunnel to be established, (2) a property of the tunnel to be established, and (3) an association of the property of the tunnel to be established with one of a plurality of different traffic types;
   b) determining whether or not the network device is the egress of the tunnel to be established; and
   c) responsive to a determination that the network device is at the egress of the tunnel to be established, programming, automatically, a decapsulator on the network device and associating the decapsulator with the property of the tunnel to be established, to process, in accordance with the traffic type, packets received on the destination port of the tunnel to be established, and otherwise, responsive to a determination that the network device is not the egress of the tunnel to be established, setting up forwarding state to send the traffic type, wherein information received by the network device is carried as a path attribute in a BGP update message, wherein the information received by the network device is carried in a tunnel encapsulation attribute TLV, and wherein the tunnel encapsulation attribute TLV includes (A) a tunnel destination port sub-TLV having a value specifying, via the received association, the one of the plurality of different traffic types, and/or (B) a tunnel encapsulation protocol sub-TLV having a value uniquely corresponding to, and associated with, the one of the plurality of different traffic types.

* * * * *